United States Patent
Canella et al.

(10) Patent No.: US 6,980,648 B2
(45) Date of Patent: Dec. 27, 2005

(54) TELEPHONE SYSTEM WITH CURRENT REGULATION IN THE CONSTANT CURRENT REGION

(75) Inventors: Alberto Canella, Villach (AT); Gerhard Noessing, Villach (AT)

(73) Assignee: Infineon Technologies AG, Munich (DE)

( * ) Notice: Subject to any disclaimer, the term of this patent is extended or adjusted under 35 U.S.C. 154(b) by 322 days.

(21) Appl. No.: 10/218,966

(22) Filed: Aug. 14, 2002

(65) Prior Publication Data
US 2003/0048896 A1    Mar. 13, 2003

(30) Foreign Application Priority Data
Aug. 17, 2001    (DE) ................................. 101 40 358

(51) Int. Cl.⁷ ........................................... H04M 19/00
(52) U.S. Cl. ..................................... 379/413; 379/400
(58) Field of Search .................................. 379/413, 400

(56) References Cited

U.S. PATENT DOCUMENTS

| 4,935,960 A | * | 6/1990 | Takato et al. ................ 379/413 |
| 5,335,272 A | * | 8/1994 | Lofmark et al. ............ 379/413 |
| 5,619,567 A | | 4/1997 | Apfel ........................ 379/413 |
| 6,122,367 A | | 9/2000 | Eriksson et al. ............ 379/399 |
| 6,731,749 B1 | * | 5/2004 | Sacca et al. ................ 379/413 |

FOREIGN PATENT DOCUMENTS

| EP | 0269579 A2 | 6/1988 | .......... H04M 19/00 |
| EP | 0917339 A2 | 5/1999 | .......... H04M 19/00 |
| WO | WO 91/11876 | 8/1991 | .......... H04M 19/00 |

* cited by examiner

*Primary Examiner*—Daniel Swerdlow
(74) *Attorney, Agent, or Firm*—Fish & Richardson P.C.

(57) ABSTRACT

A telephone system includes a transmission line for connection to at least one telephone and a telephone interface in communication with the transmission line. The telephone interface provides DC power when a telephone connected to the transmission line is in an off-hook state. A controller in communication with the telephone interface generates a pre-defined DC characteristic of the telephone interface, and a regulator in communication with the controller adaptively translates the DC characteristic.

16 Claims, 2 Drawing Sheets

TELEPHONE SYSTEM WITH CURRENT REGULATION IN THE CONSTANT CURRENT REGION

FIELD OF INVENTION

This invention relates to telephone systems, and in particular, to controlling current on the telephone line.

RELATED APPLICATIONS

This application claims the benefit of the Aug. 17, 2001 priority date of German application 10140358.5-31, the contents of which are herein incorporated by reference.

BACKGROUND

A telephone knows essentially two basic states, namely on-hook (the receiver is on the hook) and off-hook (the receiver has been taken off the hook). In the on-hook state, a constant voltage is output—there is no DC current flowing—by an SLIC (Subscriber Line Interface Circuit), and in the off-hook state a constant current is output. As a result, it is possible to detect the respective state of the telephone.

In the off-hook state, the interface (SLIC) behaves as a power source which drives a load which is composed essentially of the resistance of the transmission line and the impedance of the telephone. An equivalent circuit diagram of the interface, composed of a power source I0 with an output resistance RI, and a load resistance RL, illustrated in FIG. 1a.

This equivalent circuit diagram applies to what is referred to as the constant current region A between 0V, and a break point voltage VK in which the current profile is relatively flat (cf. FIG. 1b).

In FIG. 1b, a DC characteristic of the current Ia,b which is supplied by the SLIC in the off-hook state is represented plotted against the voltage Va,b present at the overall load. The DC characteristic can be divided essentially into the constant current region A whose gradient is determined by the output resistance RI, and into a resistance region B whose gradient is determined by a resistance RR. The break point between the constant current region A and the resistance region B is determined by what is referred to as the break point current IK and the break point voltage VK. The maximum achievable voltage is designated by Vlim.

The DC characteristic is usually implemented as software.

In addition, a straight line b whose gradient corresponds to the load resistance RL is shown in FIG. 1b. The working point AP of the circuit occurs at the point of intersection of the section a and of the straight line b.

If a telephone set is closer to the switching office, the gradient of the straight line b becomes steeper (smaller line resistance) and the working point AP migrates in the direction of higher current values (arrow C). If, on the other hand, the line transmission between the office and telephone set is longer, the working point AP migrates in the direction opposed to that of arrow C.

As is apparent, the current flowing on the transmission line, and thus also the power loss, depends on the length of the transmission line, the power loss being greater with short lines than with long lines.

In order to reduce the power loss with short lines it would be theoretically conceivable to limit the current flowing on the transmission line by means of a higher output resistance RI. The relatively flat profile of the DC characteristic a could then be obtained in the constant current region A (arrow D). If there is an infinitely high output resistance RI, the current will be constant and equal to the break point current IK, in which case the line c shown by dotted lines will then be set. However, in practice it is not possible to execute the current source with an infinitely high output resistance.

To generate high output resistances it would also be conceivable to program the output resistance RI (for example in a range between 40 to 5 kOhm). High output resistances have the advantage that a DC regulator provided in a Codec (coder/decoder) for setting the working point AP settles more quickly. However, given extremely flat current profiles, this has a negative effect on the stability properties of the regulation. In addition, high output resistances RI influence the AC impedance of the circuit, and worsen in particular the reflections at the end of the transmission line and the frequency response.

If, on the other hand, the output resistance RI is set too small, the current continues increasing for short transmission lines, as a result of which the power loss continues increasing.

SUMMARY

The object of the present invention is therefore to reduce the power loss in the constant current region while maintaining optimum regulating properties.

The essential idea of the invention is to regulate the current flowing in the constant current region, essentially by parallel displacement of the DC characteristic to a setpoint value which is preferably equal to the original break point current of the DC characteristic. The increase in the DC characteristic in the constant current region should remain approximately of such a magnitude here that the stability properties of the regulation for setting a working point are not worsened.

According to one embodiment of the invention, a parameter of the DC characteristic, in particular the break point current, is newly set for this purpose, and indeed preferably in such a way that the current flowing in the off-hook state on the transmission line is essentially equal to the original break point current of the DC characteristic. The increase in the DC characteristic in the constant current region is preferably left unchanged here.

The regulation of the break point current is preferably carried out by means of a regulating device in which a setpoint current value can be predefined for the constant current region of the DC characteristic which is preferably equal to the break point current of the DC characteristic.

The DC characteristic is predefined by a unit (controller), the definition parameters of the DC characteristic, for example the break point voltage VK, the break point current IK, the resistance in the constant current region RI, the resistance in the resistance region RR or the maximum voltage Vlim being programmable.

In order to measure the current flowing on the transmission line, a current measuring device is provided which is preferably arranged in the SLIC.

According to one preferred embodiment of the invention, the regulating device comprises a subtractor or comparator which generates an error signal formed from the difference between the setpoint current value and the measured current value.

The error signal is preferably fed to an integrator and subsequently subtracted from the current setpoint value in order to obtain a new, reduced break point current for the DC characteristic.

A lowpass is preferably arranged downstream of the unit for generating the DC characteristic in order to suppress interference in the signal.

The regulation according to the invention preferably comprises two control loops, namely a first control loop for setting a working point and a second control loop for regulating the break point current.

According to one preferred embodiment of the invention, regulation of the break point current is carried out only in the constant current region of the DC characteristic and switched off outside the constant current region. For this purpose, suitable means (sensors) are provided for detecting operation in the constant current region.

BRIEF DESCRIPTION OF THE DRAWINGS

The invention is explained in more detail below by way of example by reference to the appended drawings, in which.

DETAILED DESCRIPTION

Figure 1A:
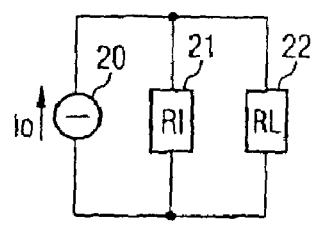
FIG. 1a shows an equivalent circuit diagram of a power supply in the off-hook state.

FIG. 1a shows an equivalent circuit diagram of a power supply for a telephone 1 as emulated in the off-hook state (receiver off the hook) by an interface (SLIC 2). The equivalent circuit diagram comprises a constant current source 20 which drives a current I0, and an output resistor RI 21. The load to be driven comprises the resistor 4 of the transmission line 6, the impedance of the telephone 1 and the protective resistors 5 for protecting the system against overloading (cf. FIG. 2).

Figure 1B:
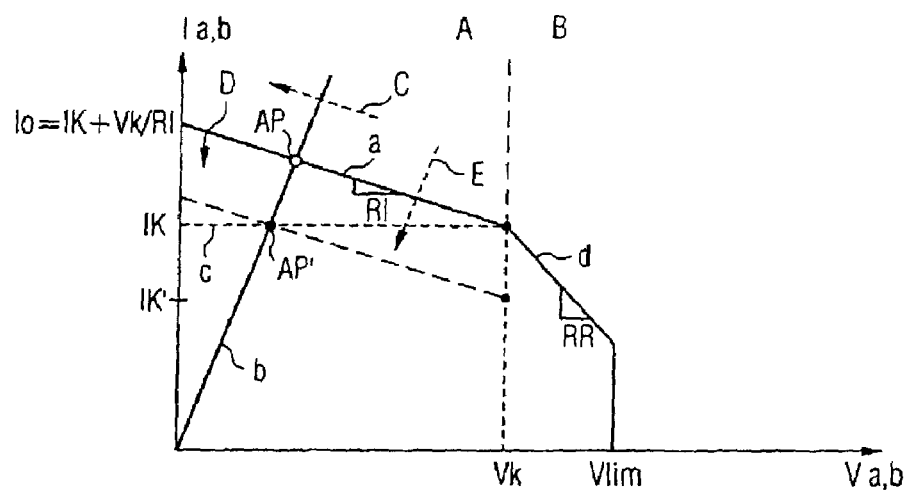
FIG. 1b shows a DC characteristic of the power supply in the off-hook state.

FIG. 1b shows a DC characteristic for the off-hook state of a telephone 1. The DC characteristic has essentially two regions, a constant current region A and a resistance region B. The constant current region A is characterized by a characteristic curve a with a relatively small gradient which is determined by the output resistance 21 RI, and the resistance region B is characterized by a characteristic curve d with a relatively large gradient. Between the constant current region A and resistance region B there is a break point with a break point voltage VK and a break point current IK. The following applies for the constant current region: I0=IK+VK/RI.

The resistance region B extends up to a maximum voltage value Vlim, the gradient in the resistance region being determined by a resistor RR.

In addition, FIG. 1b contains a load characteristic curve b whose gradient is determined essentially by the line resistance 4. A working point AP is set at the intersection of DC characteristic a and load characteristic curve b.

With short transmission lines, the working point AP migrates in the direction of the arrow C, and in the case of relatively long transmission lines it migrates in the opposite direction. With short transmission lines, a relatively high current value is obtained here.

Figure 2:
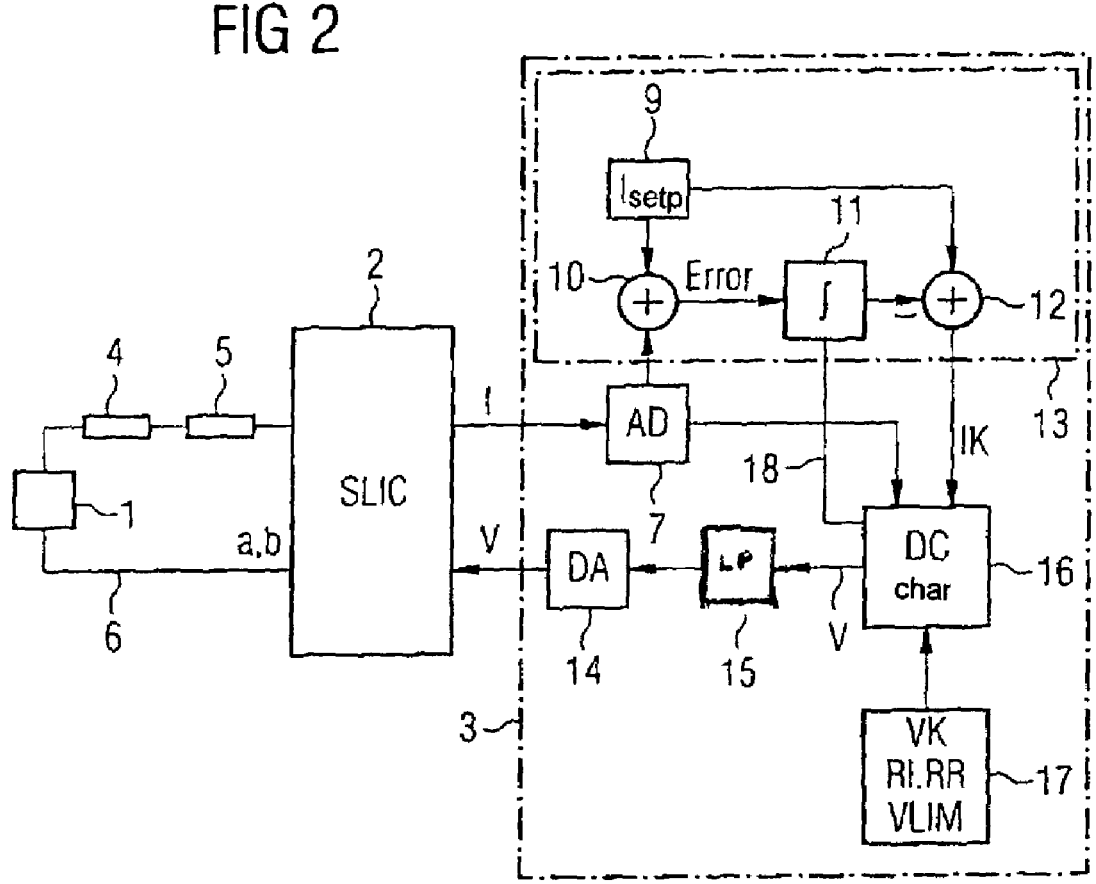
FIG. 2 shows an exemplary embodiment of current regulation in the constant current region.

A telephone system with a regulating circuit for reducing the power loss in the off-hook mode is represented in FIG. 2. The portion of the telephone system which is shown comprises a telephone 1, a Codec 3 (coder/decoder) and a SLIC 2, arranged between the telephone 1 and Codec 3, as interface. In the off-hook state, the SLIC 2 supplies the telephone 1 with a virtually constant current Ia,b. Here, the SLIC 2 and Codec 3 behave as a power supply whose DC characteristic is represented in FIG. 1b.

The DC characteristic is predefined by a corresponding unit 16, for example a programmable controller. The controller outputs a voltage signal V to the SLIC 2 which amplifies it in order to drive the load 1. A load-dependent current flow is set on the transmission line 6 in the process.

The Codec 3 comprises two control loops, namely an inner control loop for setting a working point AP and an outer control loop for setting a break point current IK'.

The inner control loop comprises an A/D converter 7 with which a current signal supplied by the SLIC 2 is converted into digital form and fed to the unit 16.

The second, outer control loop comprises a control device 13 for generating a break point current IK' which is fed to the unit 16. The regulating device 13 comprises a comparator 10 at which a predefined setpoint current value Isetp 9 is compared with the current value measured by the SLIC 2, and an error signal Error formed from the difference between the two values is output.

The error signal Error is fed to an integrator 11 and subtracted from the predefined setpoint current value Isetp 9 at a node 12. The resulting different signal results in a new break point current IK' (see FIG. 1b) which is fed to the unit 16. The break point current is set here to a value, IK' at which the current Ia,b is equal to the predefined setpoint current value Isetp 9 (in the illustrated case equal to the original break point current IK of the DC characteristic). In FIG. 1b this is apparent in a parallel displacement of the branch a of the DC characteristic in the direction of the arrow E.

The regulation of the break point current is active only in the constant current region A. In order to determine whether the system operates in the constant current region, the unit 16 is connected to the integrator 11 via a line 18. Outside the constant current region A, the original DC characteristic is set again.

What is claimed is:

1. A telephone system comprising:
    a transmission line for connection to at least one telephone;
    a telephone interface in communication with the transmission line, the telephone interface being configured to provide DC power when a telephone connected to the transmission line is in an off-hook state;
    a controller in communication with the telephone interface for generating a pre-defined DC characteristic of the telephone interface, the characteristic comprising a constant current region being limited by a breakpoint current; and
    a regulator in communication with the controller for adaptively translating the DC characteristic by parallel displacement, wherein a slope of the DC characteristic in the constant current region remains essentially constant.

2. The telephone system of claim 1, wherein the regulator is configured to receive a pre-defined transmission-line-current setpoint.

3. The telephone system of claim 2, wherein the pre-defined setpoint is equal to the breakpoint current of the DC characteristic.

4. The telephone system of claim 1, wherein the regulator is configured to provide a new breakpoint current to the controller, the breakpoint current being selected on the basis of an error signal provided to the regulator.

5. The telephone system of claim 4, wherein the regulator is configured to change the breakpoint current until the transmission-line current is equal to a pre-defined setpoint.

6. The telephone system of claim 1, wherein the controller is configured to programmably receive a parameter associated with the pre-defined DC characteristic.

7. The telephone system of claim 6, wherein the parameter is selected from the group consisting of: a breakpoint voltage, a first resistance for controlling the slope of the DC characteristic in the constant current region, a second resistance for controlling a slope of the DC characteristic outside the constant current region, and a maximum voltage on the transmission line.

8. The telephone system of claim 1, wherein the regulator comprises a first comparator for generating an error signal on the basis of a difference between a transmission-line-current setpoint and a measured transmission-line current.

9. The telephone system of claim 8, wherein the regulator further comprises an integrator in communication with the first comparator for receiving the error signal therefrom.

10. The telephone system of claim 8, wherein the regulator further comprises a second comparator for generating a breakpoint current value on the basis of a difference between an integrated error signal and a transmission-line-current setpoint.

11. The telephone system of claim 1, further comprising a current measuring device for measuring current flowing on the transmission line.

12. The telephone system of claim 11, wherein the controller comprises an input for receiving a current signal from the current measuring device.

13. The telephone system of claim 1, further comprising a low-pass filter in communication with an output of the controller.

14. The telephone system of claim 1, wherein the regulator comprises means for detecting an off-hook state.

15. A telephone system comprising:
   a transmission line for connection to at least one telephone;
   a telephone interface in communication with the transmission line, the telephone interface being configured to provide DC power when a telephone connected to the transmission line is in an off-hook state;
   a controller in communication with the telephone interface for generating a pre-defined DC characteristic of the telephone interface; and
   a regulator in communication with the controller for adaptively translating the DC characteristic, wherein the regulator comprises:
   a first comparator for generating an error signal on the basis of a difference between a transmission-line-current setpoint and a measured transmission-line current; and
   an integrator in communication with the first comparator for receiving the error signal therefrom.

16. A telephone system comprising:
   a transmission line for connection to at least one telephone;
   a telephone interface in communication with the transmission line, the telephone interface being configured to provide DC power when a telephone connected to the transmission line is in an off-hook state;
   a controller in communication with the telephone interface for generating a pre-defined DC characteristic of the telephone interface; and
   a regulator in communication with the controller for adaptively translating the DC characteristic, wherein the regulator comprises:
   a first comparator for generating an error signal on the basis of a difference between a transmission-line-current setpoint and a measured transmission-line current; and
   a second comparator for generating a breakpoint current value on the basis of a difference between an integrated error signal and a transmission-line-current setpoint.

* * * * *